(12) United States Patent
Kim et al.

(10) Patent No.: US 10,665,831 B2
(45) Date of Patent: May 26, 2020

(54) BATTERY MODULE AND BATTERY PACK COMPRISING SAME

(71) Applicant: LG CHEM, LTD., Seoul (KR)

(72) Inventors: Hwa-Joong Kim, Daejeon (KR);
Tae-Young Kang, Daejeon (KR);
Jun-Yeob Seong, Daejeon (KR);
Sung-Chun Yu, Daejeon (KR);
Yong-Joon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 98 days.

(21) Appl. No.: 15/571,446

(22) PCT Filed: Oct. 24, 2016

(86) PCT No.: PCT/KR2016/011979
§ 371 (c)(1),
(2) Date: Nov. 2, 2017

(87) PCT Pub. No.: WO2017/099347
PCT Pub. Date: Jun. 15, 2017

(65) Prior Publication Data
US 2018/0309100 A1    Oct. 25, 2018

(30) Foreign Application Priority Data
Dec. 9, 2015  (KR) .................. 10-2015-0175022

(51) Int. Cl.
*H01M 2/10*        (2006.01)
*H01M 10/42*    (2006.01)
(Continued)

(52) U.S. Cl.
CPC ........... *H01M 2/1077* (2013.01); *B60L 50/64* (2019.02); *H01M 2/0237* (2013.01); *H01M 2/10* (2013.01);
(Continued)

(58) Field of Classification Search
CPC .. H01M 2/02–08; H01M 2/10; H01M 2/1016; H01M 10/42–4285
See application file for complete search history.

(56) References Cited

U.S. PATENT DOCUMENTS 6,207,319 B1 * 3/2001 Nam .................. H01M 2/0413
429/163
6,312,852 B1   11/2001 Wagner
(Continued)

FOREIGN PATENT DOCUMENTS

JP    2007-250330 A    9/2007
JP    2013-211240 A   10/2013
(Continued)

OTHER PUBLICATIONS

International Search Report for PCT/KR2016/011979 (PCT/ISA/210) dated Feb. 13, 2017.

*Primary Examiner* — Jonathan G Leong
*Assistant Examiner* — Jacob Buchanan
(74) *Attorney, Agent, or Firm* — Birch, Stewart, Kolasch & Birch, LLP

(57) ABSTRACT

Provided are a battery module and a battery pack including the same. The battery module includes: a cartridge assembly in which a plurality of cartridges, each accommodating a battery cell, are stacked on each other; a cover surrounding the cartridge assembly; a bushing member inserted through the cartridge assembly and the cover, and protruding to the outside of the cover by a pre-set interval; and a locking member inserted into the bushing member and locking the cover.

15 Claims, 9 Drawing Sheets

(51) Int. Cl.
  H01M 2/02   (2006.01)
  B60L 50/64  (2019.01)
(52) U.S. Cl.
  CPC ....... H01M 2/1016 (2013.01); H01M 2/1061 (2013.01); H01M 10/42 (2013.01); H01M 10/425 (2013.01); H01M 2220/20 (2013.01)

(56) References Cited

U.S. PATENT DOCUMENTS

| | | | |
|---|---|---|---|
| 2006/0246350 A1* | 11/2006 | Takayama | B60L 3/0046 |
| | | | 429/178 |
| 2008/0248377 A1 | 10/2008 | Hashida | |
| 2011/0135975 A1* | 6/2011 | Fuhr | H01M 2/08 |
| | | | 429/53 |
| 2012/0196174 A1 | 8/2012 | Mikus et al. | |
| 2013/0196205 A1* | 8/2013 | Silk | H01M 2/0245 |
| | | | 429/99 |
| 2013/0236761 A1* | 9/2013 | Seong | H01M 2/1077 |
| | | | 429/99 |
| 2014/0242438 A1* | 8/2014 | Tanaka | H01M 2/024 |
| | | | 429/121 |
| 2016/0072103 A1* | 3/2016 | Renn | H01M 2/0202 |
| | | | 429/185 |
| 2017/0244134 A1 | 8/2017 | Shaffer, II | |

FOREIGN PATENT DOCUMENTS

| | | |
|---|---|---|
| KR | 10-2013-0030543 A | 3/2013 |
| KR | 10-2013-0042430 A | 4/2013 |
| KR | 10-2014-0069217 A | 6/2014 |

* cited by examiner

BATTERY MODULE AND BATTERY PACK COMPRISING SAME

TECHNICAL FIELD

The present disclosure relates to a battery module and a battery pack including the same, and more particularly, to a battery module, in which a cartridge may be prevented from being damaged during pressurization of a locking member because the locking member does not directly contact a cover or the cartridge, and a battery pack including the battery module.

The present application claims priority to Korean Patent Application No. 10-2015-0175022 filed on Dec. 9, 2015 in the Republic of Korea, the disclosure of which is incorporated herein by reference.

BACKGROUND ART

According to technical development and an increase in demands regarding mobile devices, demands for secondary batteries as an energy source are rapidly increasing. Generally, nickel cadmium batteries or hydrogen ion batteries have been used as secondary batteries, but recently, lithium secondary batteries that have very low self-discharge rates, have high energy densities, and are freely charged and discharged because a memory effect is barely generated compared to nickel-based secondary batteries, are widely used.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery case, that seals and accommodates the electrode assembly with an electrolyte.

The lithium secondary battery includes a positive electrode, a negative electrode, a separator disposed therebetween, and an electrolyte, and is classified into a lithium ion battery (LIB), a polymer lithium ion battery (PLIB), or the like based on which positive electrode active material and negative electrode active material are used. Generally, an electrode of the lithium secondary battery is formed by coating the positive or negative electrode active material on a current collector, such as an aluminum or copper sheet, a mesh, a film, a foil, or the like, and then drying the positive or negative electrode active material.

Generally, in a battery module of the secondary battery, cartridges accommodating battery cells are provided in a plural number and are stacked on each other, and such a plurality of cartridges are surrounded by a cover and then the cover is locked by a locking member, such as a bolt. Here, when the locking member, such as a bolt, directly contacts and pressurizes the cartridge that is, for example, a plastic injection molded body, the injection molded body may be damaged, and thus in order to prevent this, a bushing member is inserted first, and then the locking member, such as a bolt, is inserted into the bushing member.

However, the cartridge may be prevented from being damaged because a body portion of the bolt contacts the bushing member, but since a head portion of the bolt directly contacts the cover, when the bolt is rotated for locking, the head portion of the bolt pressurizes the cartridge adhered to the cover, and thus the cartridge may be damaged.

DISCLOSURE

Technical Problem

Therefore, the present disclosure is directed to providing a battery module, in which a cartridge may be prevented from being damaged during pressurization of a locking member because the locking member does not directly contact a cover or the cartridge, and a battery pack including the battery module.

Also, the present disclosure is directed to providing a battery module, in which an interval between cartridges or between a cartridge and a cover may be uniformly maintained by preventing the cartridge or the cover from moving along a bushing member when an external force is applied to the battery module, and a battery pack including the battery module.

Technical Solution

In one aspect of the present disclosure, there is provided a battery module including: a cartridge assembly in which a plurality of cartridges, each accommodating a battery cell, are stacked on each other; a cover surrounding the cartridge assembly; a bushing member inserted through the cartridge assembly and the cover, and protruding to the outside of the cover by a pre-set interval; and a locking member inserted into the bushing member and locking the cover.

Also, the cover may include a buffer member, and the locking member may contact the buffer member.

Also, the buffer member may be combined to the cover along an outer circumference of the bushing member, and the locking member contacts the buffer member at an outer side and contacts the bushing member at an inner side.

Also, the buffer member may be prepared as a rubber pad.

Also, each of the plurality of cartridges may include a first protrusion such that an interval is formed between the plurality of stacked cartridges.

Also, the first protrusion may include a plurality of first protrusions formed on each of the plurality of cartridges along a circumference of the bushing member.

Also, the cover may include a second protrusion such that an interval is formed from the cartridge assembly.

Also, the battery module may further include a board supporter supporting a board comprising a circuit, wherein the board supporter may be disposed between the cover and the cartridge assembly, and may include a third protrusion such that an interval is formed from the cartridge assembly.

Meanwhile, in another aspect of the present disclosure, there is also provided a battery pack including the battery module, and a vehicle including the battery module.

Advantageous Effects

According to embodiments of the present disclosure, a cartridge may be prevented from being damaged during pressurization of a locking member because a bushing member protrudes to the outside of a cover and thus the locking member inserted into the bushing member does not directly contact the cover or the cartridge.

Also, an interval between the cartridges or between the cartridge and the cover may be uniformly maintained because a protrusion is formed on the cartridge or the cover and thus the cartridge or the cover is prevented from moving along the bushing member when an external force, in particular, an external force in a direction parallel to the bushing member, is applied to the battery module.

MODE FOR DISCLOSURE

Figure 1:
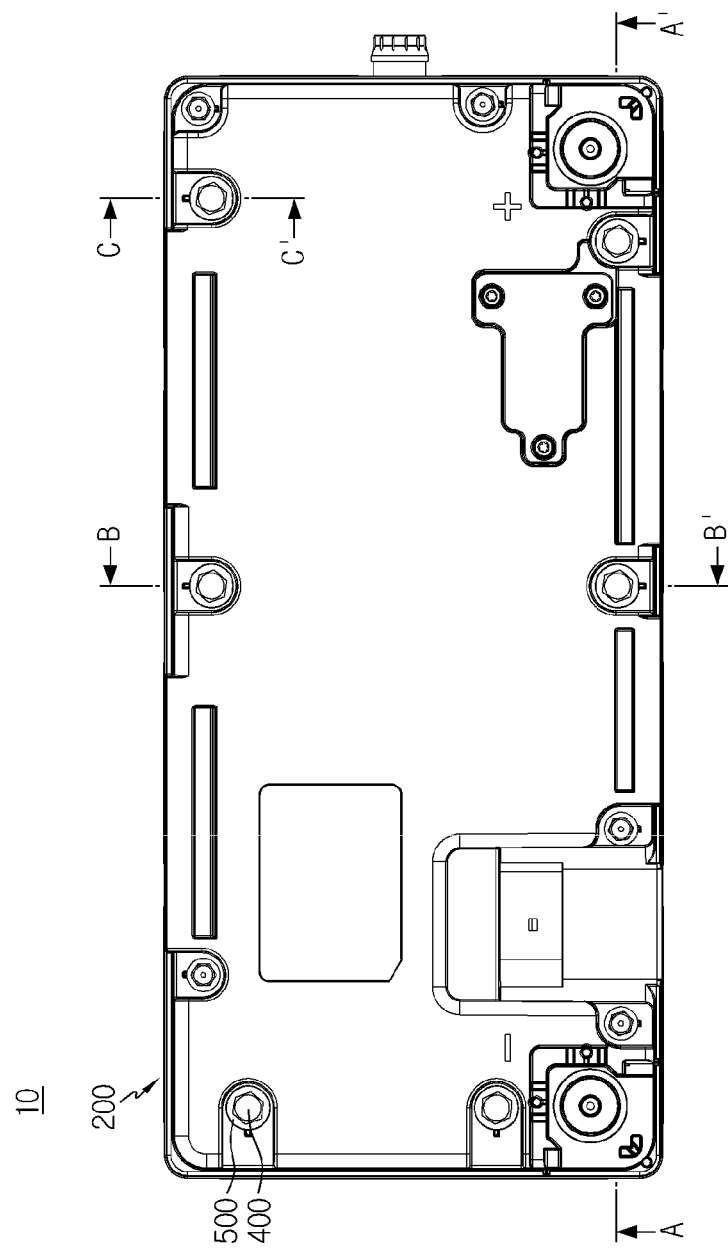
FIG. 1 is a plan view of a battery module according to an embodiment of the present disclosure.

Hereinafter, a battery module according to preferred embodiments of the present disclosure and a battery pack including the same will be described in detail with reference to the accompanying drawings.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, for convenience of description and clarity, each component or a size of a certain part forming the component may be exaggerated, omitted, or schematically illustrated. Accordingly, the size of each component does not fully reflect the actual size. In the description of the present disclosure, certain detailed explanations of related art are omitted when it is deemed that they may unnecessarily obscure the essence of the disclosure.

The term 'combined' or 'connected' used in the present specification includes not only a case where one member is directly combined or directly connected to another member, but also a case where one member is indirectly combined or indirectly connected to another member via a connecting member.

Meanwhile, a locking member in the present disclosure may include various locking members capable of locking an upper cover and a lower cover, but for convenience of description, hereinafter, the locking member is described limitedly to a bolt.

Figure 2:
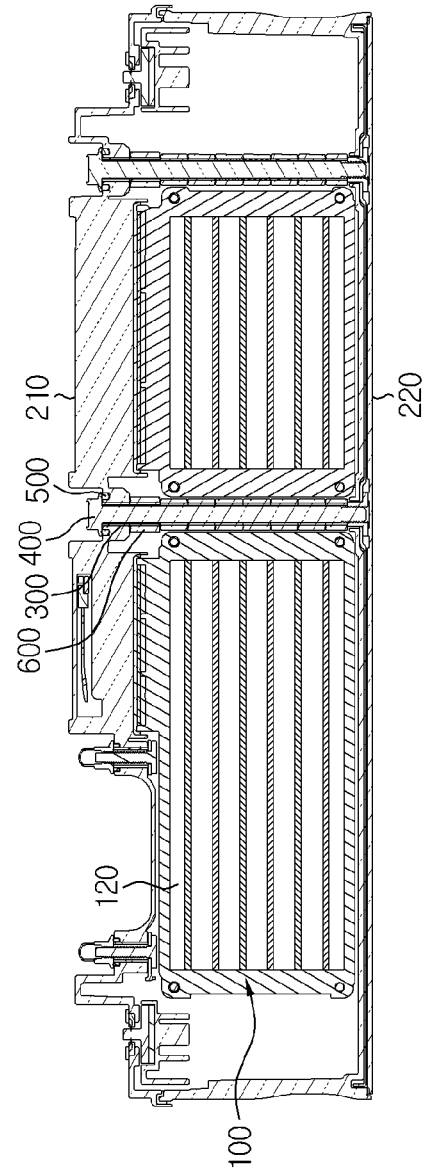
FIG. 2 is a cross-sectional view taken along a line A-A' of FIG. 1.
Figure 3:
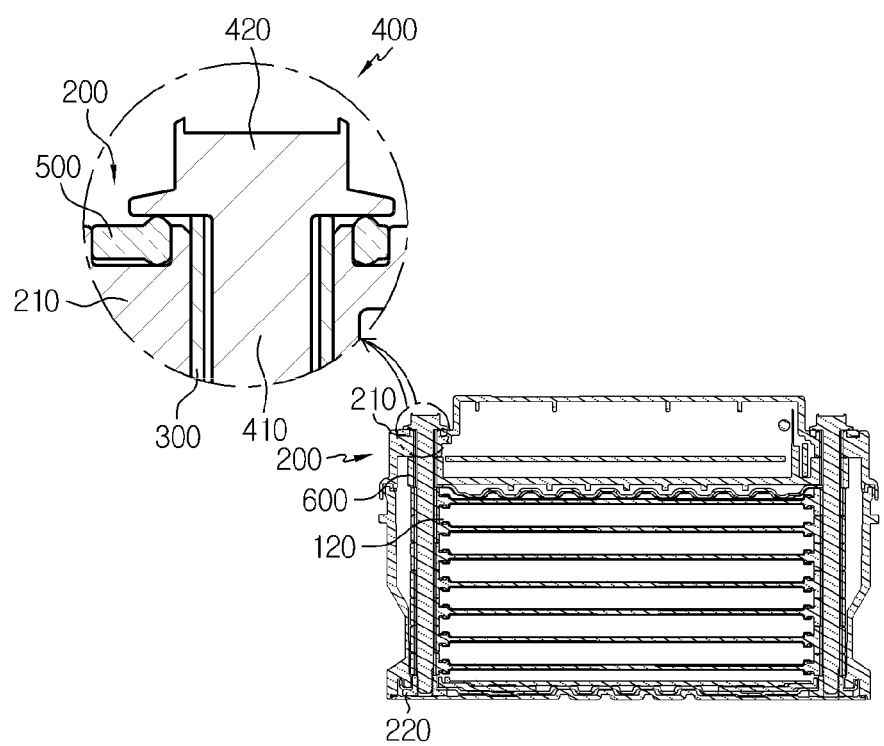
FIG. 3 is a cross-sectional view taken along a line B-B' of FIG. 1 and a partially enlarged view thereof.
Figure 4:
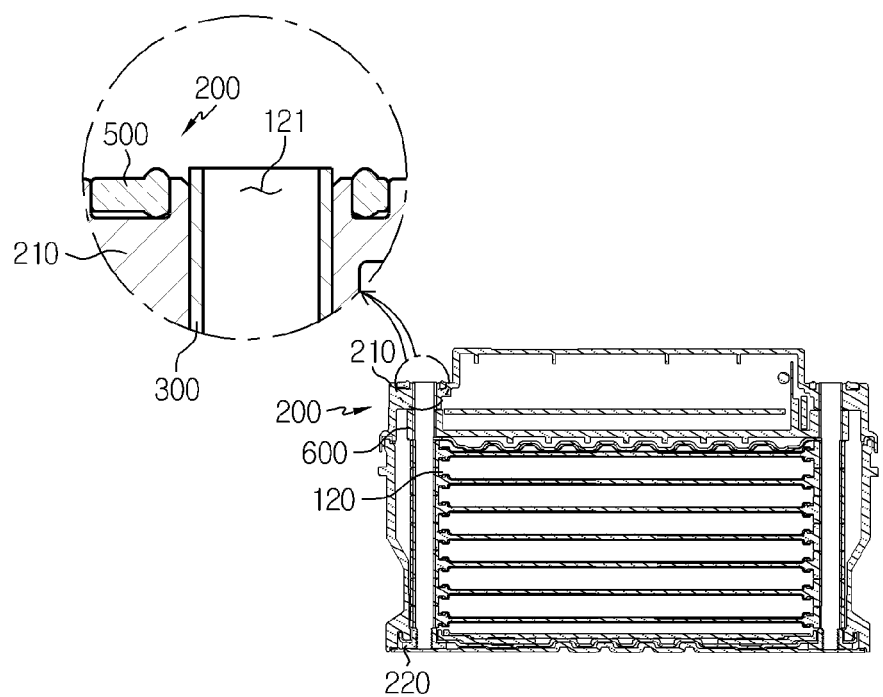
FIG. 4 is a view illustrating form in which a locking member is removed from FIG. 3.
Figure 5:
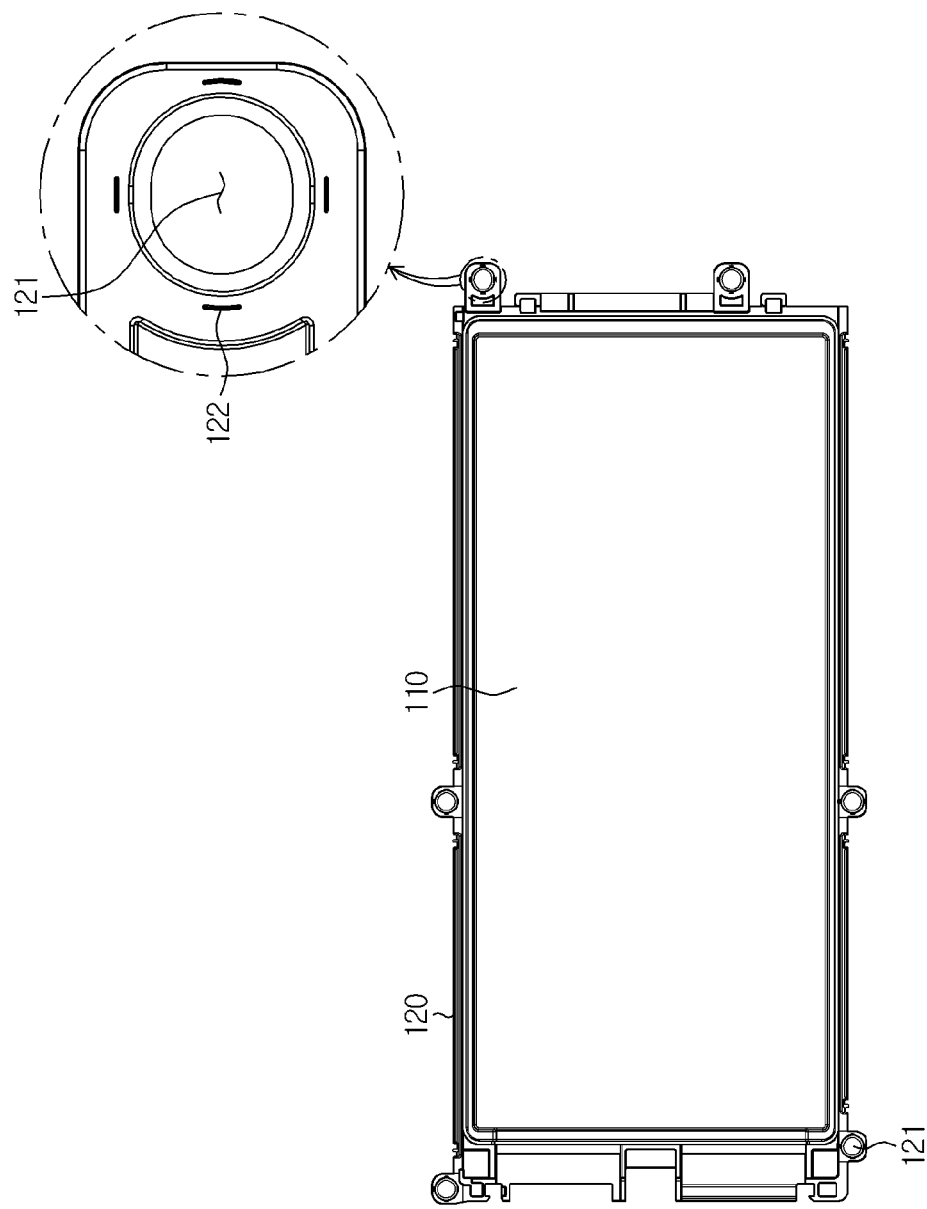
FIG. 5 is a plan view of a cartridge in a battery module according to an embodiment of the present disclosure, and a partially enlarged view thereof.

FIG. 1 is a plan view of a battery module according to an embodiment of the present disclosure, FIG. 2 is a cross-sectional view taken along a line A-A' of FIG. 1, FIG. 3 is a cross-sectional view taken along a line B-B' of FIG. 1 and a partially enlarged view thereof, FIG. 4 is a view illustrating form in which a locking member is removed from FIG. 3, and FIG. 5 is a plan view of a cartridge in a battery module according to an embodiment of the present disclosure, and a partially enlarged view thereof.

Referring to FIGS. 1 through 5, a cartridge 120 may be manufactured via injection molding of plastic, and includes an accommodating portion that accommodates a battery cell 110. The cartridge 120 may be prepared as a type of a frame combined to an exterior of the battery cell 110 to protect the battery cell 110. A plurality of the cartridges 120 may be prepared to be stacked on each other to form a cartridge assembly 100, and an insertion hole 121 into which a bolt 400 is inserted may be formed on the cartridge 120 such that the plurality of stacked cartridges 120, i.e., the cartridge assembly 100, and a cover 200 protecting the cartridge assembly 100 are locked.

Meanwhile, a first protrusion 122 may be formed on the cartridge 120 such that an interval is formed and maintained between the plurality of cartridges 120, and details thereof will be described later.

The cartridge assembly 100 includes the plurality of cartridges 120 accommodating the battery cells 110, and the plurality of cartridges 120 may form the cartridge assembly 100 by, for example, being stacked in a longitudinal direction. The cartridge assembly 100 is accommodated in an internal space formed inside the cover 200, and the battery cell 110 accommodated in the cartridge 120 may be protected by being accommodated in the internal space of the cover 200.

Meanwhile, the cartridge assembly 100 may include a connector element (not shown) or a terminal element (not shown). The connector element (not shown) may include various forms of electric connection parts or connection members to be connected to, for example, a battery management system (BMS) for providing data regarding a voltage or temperature of the battery cell 110, or the like. Also, the terminal element (not shown) includes a positive electrode terminal (not shown) and a negative electrode terminal (not shown) as a main terminal (not shown) connected to the battery cell 110, and the terminal element (not shown) may include a terminal bolt (not shown) to be electrically connected to the outside.

Referring to FIGS. 1 and 3, the cover 200 accommodates and surrounds the cartridge assembly 100, and accordingly protects the cartridge assembly 100 from external vibration or an external impact. The cover 200 may be formed in a shape corresponding to a shape of the cartridge assembly 100. For example, when the shape of the cartridge assembly 100 is prepared in a hexahedron shape, the cover 200 may also be prepared in a hexahedron shape to correspond thereto. The cover 200 may be manufactured via, for example, a plate of a metal material, and when the cover 200 is manufactured via the plate of the metal material, the cover 200 may include an upper cover 210 surrounding the cartridge assembly 100 at an upper side and a lower cover 220 combined to the upper cover 210 at a lower side of the cartridge assembly 100. However, the scope of right of the present disclosure is not limited thereto.

A penetration portion (not shown), through which the connector element (not shown) or the terminal element (not shown) described above may be externally exposed, may be formed on the cover 200. In other words, the connector element (not shown) or the terminal element (not shown) may be electrically connected to an external predetermined part or member, and the penetration portion (not shown) may be formed on the cover 200 so that such an electric connection is not interfered by the cover 200. Also, the connector element (not shown) or the terminal element (not shown) may be exposed to the outside of the cover 200 and connected to an external component through the penetration portion (not shown) formed on the cover 200. The penetration portion (not shown) may be formed to cut at least one side of the cover 200. Here, the penetration portion (not shown) may not necessarily be cut to externally expose the connector element (not shown) or the terminal element (not shown), and may alternatively be formed in a small hole into which a wire or the like may enter as long as the connector element (not shown) or the terminal element (not shown) is electrically connected to an external component.

Meanwhile, a second protrusion 211 may be formed on the cover 200 such that an internal is formed and maintained between the cover 200 and the cartridge 120, and details thereof will be described later.

Referring to FIGS. 3 and 4, a bushing member 300 may be inserted through the cartridge assembly 100 and the cover 200. As described above, the cartridge 120 may be manufactured by using a plastic material via injection molding. Here, when the cartridge assembly 100 in which the plurality of cartridges 120 are stacked is surrounded by the cover 200 and then the cover 200 is locked by the bolt 400, the cartridge 120 formed of a plastic material may be damaged by the bolt 400 when the bolt 400 pressurizes the cartridge 120 during rotation of the bolt 400 for locking. In order to prevent such damage to the cartridge 120, the insertion holes 121 are prepared on the cartridge 120 and the cover 200, and the bushing member 300 of a metal material is inserted through the insertion hole 121 of the cover 200 and the insertion holes 121 of the plurality of stacked cartridges 120. Then, the bushing member 300 is inserted into the bolt 400, and thus the bolt 400 is prevented from directly contacting the cartridge 120 or the cover 200, and damage to the cartridge 120 may be prevented even when the bolt 400 is rotated.

However, if a height of the cover 200 and a height of the bushing member 300 inserted into the cover 200 are the same, a bolt head portion 420 contacts the cover 200 and pressurizes the cover 200, and thus the cartridge 120 adhered to the cover 200 may be damaged. In detail, when the bushing member 300 penetrates through and inserted into the insertion holes 121 of the cover 200 and the cartridge assembly 100, the bushing member 300 does not protrude at all to an outer side of the cover 200, for example, an upper side of the cover 200, and thus in this case, when the bolt 400 is rotated, the bolt head portion 420 contacts the upper side of the cover 200 to pressurize the cover 200, and in addition, the cartridge 120 may be damaged since pressure of the bolt 400 is also transmitted to the cartridge 120 adhered to the cover 200.

In order to solve problems described above, referring to FIG. 3, the bushing member 300 protrudes to the outer side of the cover 200, for example, an upper side of the upper cover 210, by a pre-set interval. In other words, since the bushing member 300 protrudes to the upper side of the upper cover 210, the bolt head portion 420 contacts a protruding portion of the bushing member 300 as shown in FIG. 3 and is spaced apart from the upper cover 210. Also, even when the bolt 400 is rotated, the bolt 400 does not directly contact the upper cover 210 and thus pressure according to rotation of the bolt 400 is not directly transmitted to the cartridge 120, and accordingly, damage to the cartridge 120 may be prevented. However, when the bushing member 300 protrudes to the outer side of the cover 200, an interval is formed between the bolt 400 and the upper cover 210, and thus it may not be easy for the bolt 400 to firmly lock the upper cover 210 and the lower cover 220. In this regard, referring to FIG. 3, the upper cover 210 includes a buffer member 500 at a location near the bushing member 300, and the bolt head portion 420 contacts both the bushing member 300 and the buffer member 400 after the bolt 400 is inserted into the bushing member 300. For example, referring to FIG. 3, the buffer member 500 may be combined to the cover 200 along an outer circumference of the bushing member 300, and in this case, when the bolt 400 is inserted into the bushing member 300, the bolt head portion 420 may contact the buffer member 500 relatively at an outer side of the bolt head portion 420 and contact the bushing member 300 relatively at an inner side of the bolt head portion 420. In other words, when the bolt 400 is rotated, pressure of the bolt 400 is transferred to the upper cover 210 through the buffer member 500 to lock the upper cover 210 and the lower cover 220, and since the buffer member 500 buffers the pressure of the bolt 400, not only the upper cover 210 and the lower cover 220 are locked, but also damage to the cartridge 120 may be prevented. For such buffering, the buffer member 500 may be prepared as a rubber pad. However, the buffer member 500 is not limited to a rubber pad, and for example, various buffer members 500 capable of buffering the pressure of the bolt 400, such as a synthetic material, silicon, sponge, a spring, etc. may be used.

The bolt 400 is inserted into the bushing member 300 to lock the upper cover 210 and the lower cover 220. In other words, the bolt 400 is first inserted into the insertion hole 121 formed on the upper cover 210, is sequentially inserted into the insertion holes 121 of the plurality of stacked cartridges 120, and then is combined to the lower cover 220. Here, the bolt 400 may include a bolt body portion 410 and the bolt head portion 420.

Figure 6:
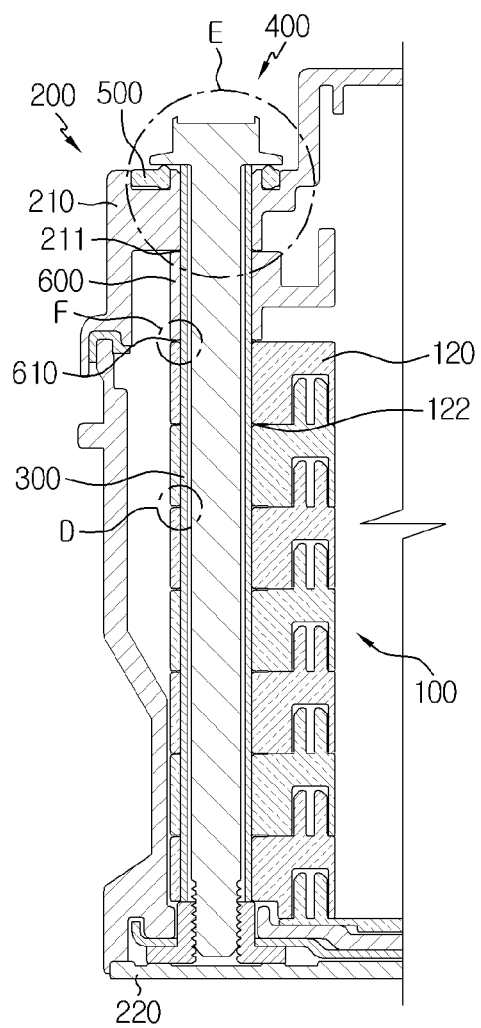
FIG. 6 is a cross-sectional view taken along a line C-C' of FIG. 1.
Figure 7:
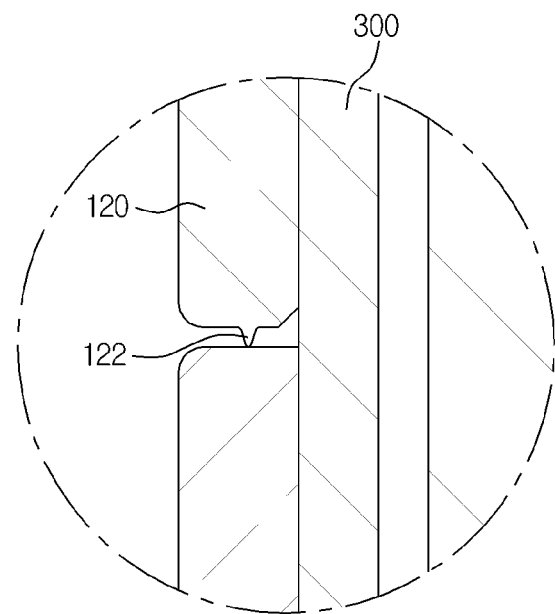
FIG. 7 is an enlarged view of a region D of FIG. 6.
Figure 8:
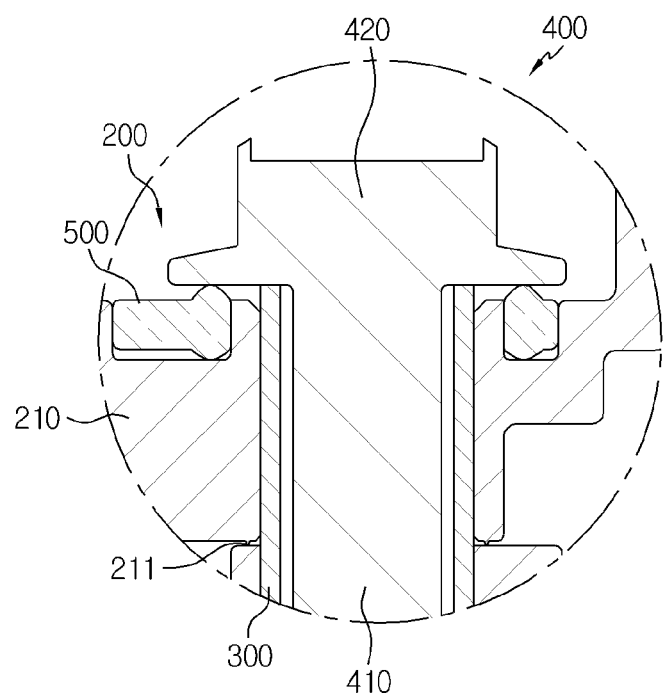
FIG. 8 is an enlarged view of a region E of FIG. 6.
Figure 9:
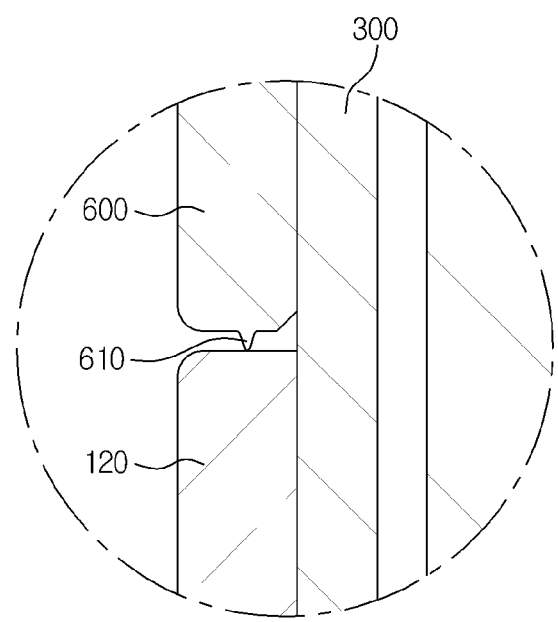
FIG. 9 is an enlarged view of a region F of FIG. 6.
Figure 10:
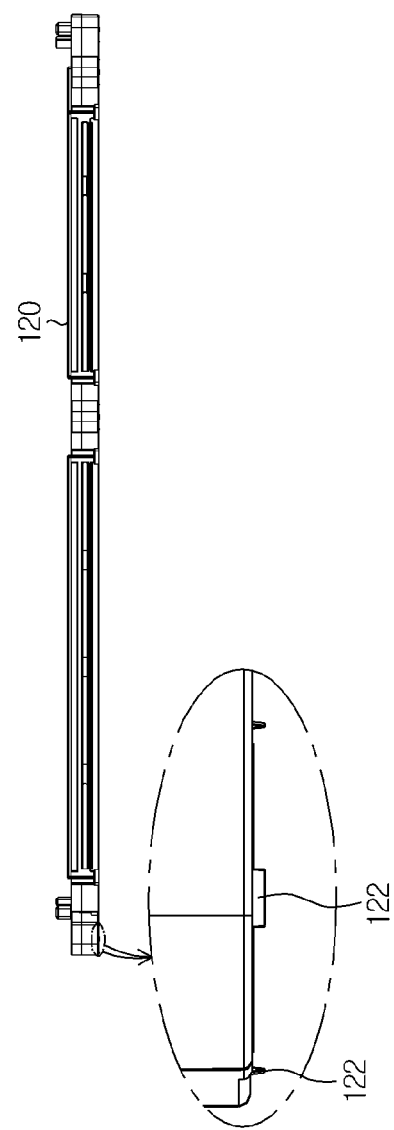
FIG. 10 is a side view of a cartridge in a battery module according to an embodiment of the present disclosure, and a partially enlarged view thereof.

FIG. 6 is a cross-sectional view taken along a line C-C' of FIG. 1, FIG. 7 is an enlarged view of a region D of FIG. 6, FIG. 8 is an enlarged view of a region E of FIG. 6, FIG. 9 is an enlarged view of a region F of FIG. 6, and FIG. 10 is a side view of a cartridge in a battery module according to an embodiment of the present disclosure, and a partially enlarged view thereof.

Referring to FIGS. 6 and 7, the first protrusion 122 may be formed on the cartridge 120 such that an interval is formed between the plurality of stacked cartridges 120. In detail, since the bushing member 300 is forcibly fit into the insertion holes 121 of the cover 200 and the cartridge 120, the interval between the cartridges 120 may be maintained even when the bushing member 300 protrudes to the outer side of the cover 200 by a pre-set interval, but a possibility that movement in any one cartridge 120 and another neighboring cartridge 120 from among the plurality of cartridges 120 may occur when an external force is directly applied in a direction aligned with the bushing member 300, in particular, in a direction parallel to the bushing member 300 is not completely ruled out. Accordingly, referring to FIGS. 6 and 7, in order to prevent occurrence of movement between the cartridges 120, which may occur in such a special environment, the first protrusion 122 may be formed on the cartridge 120.

Also, referring to FIGS. 6 and 10, a plurality of the first protrusions 122 may be prepared and formed on the cartridge 120 along a circumference of the bushing member 300. Here, the first protrusion 122 formed on any one cartridge 120 may contact another neighboring cartridge 120 to maintain an interval between the cartridges 120. For example, the first protrusion 122 may be formed on a lower side of the cartridge 120 to contact an upper side of the neighboring cartridge 120. However, this is only an example, and the first protrusion 122 may be formed in various directions of the cartridge 120, in particular, on the upper side of the cartridge 120. A predetermined interval is formed between the cartridges 120 by such a first protrusion 122 and the interval may be maintained, and in addition, movement that may occur between the cartridges 120 may be prevented.

Meanwhile, referring to FIGS. 6 and 8, the second protrusion 211 may be formed on the cover 200 such that an interval between the cover 200 and the cartridge assembly 100 is maintained. In other words, for example, considering a case where the second protrusion 211 is formed at a lower side of the cover 200, the second protrusion 211 formed on the cover 200 contacts an upper side of the cartridge 120 located immediately below the cover 200 to maintain an interval between the cover 200 and the cartridge 120. However, when a board supporter 600 described later is disposed below the cover 200, the second protrusion 211 contacts an upper side of the board supporter 600 located below the cover 200 instead of the cartridge 120 to maintain an interval between the cover 200 and the board supporter 600. Here, since functions, actions, and effects of the second protrusion 211 are the same as those of the first protrusion 122, descriptions thereof are replaced by the descriptions of the first protrusion 122.

Referring to FIG. 6, the board supporter 600 may support a board including a circuit. Here, the board is a board including various electric circuits of a battery module 10, and may include a bus bar prepared to transmit electric energy. Also, the board supporter 600 may be disposed between the cover 200 and the cartridge assembly 100, and a third protrusion 610 may be formed on the board supporter 600.

Referring to FIGS. 6 and 9, the third protrusion 610 may be formed on the board supporter 600 such that an interval between the board supporter 600 and one cartridge 120 included in the cartridge assembly 100 is maintained. In other words, for example, considering a case where the third protrusion 610 is formed at a lower side of the board supporter 600, the third protrusion 610 formed on the board supporter 600 contacts an upper side of the cartridge 120 located immediately below the board supporter 600 to maintain the interval between the board supporter 600 and the cartridge 120. Here, since functions, actions, and effects of the third protrusion 610 are the same as those of the first protrusion 122, descriptions thereof are replaced by the descriptions of the first protrusion 122.

Hereinafter, actions and effects of the battery module 10 according to an embodiment of the present disclosure are described.

Referring to FIG. 3, the plurality of cartridges 120 accommodating the battery cells 110 are stacked to form the cartridge assembly 100, and the cartridge assembly 100 is surrounded and protected by the cover 200. Also, in order to prevent damage to the cartridge 120, the bushing member 300 is inserted through the plurality of stacked cartridges 120 and the cover 200, and the bolt 400 is inserted into the bushing member 300 to lock the upper cover 210 and the lower cover 220.

Here, the bushing member 300 protrudes to the outer side of the cover 200, for example, to the upper side of the cover 200, by a pre-set interval. In other words, since the bushing member 300 protrudes to the upper side of the cover 200, the bolt head portion 420 contacts the protruding portion of the bushing member 300 as shown in FIG. 3 to be spaced apart from the cover 200. Also, even when the bolt 400 is rotated, the bolt 400 does not directly contact the cover 200, and thus pressure according to rotation of the bolt 400 is not directly transmitted to the cartridge 120, and accordingly, damage to the cartridge 120 may be prevented.

In this case, when an external force is directly applied in a direction aligned with the bushing member 300, in particular, in a direction parallel to the bushing member 300, movement may occur between any one cartridge 120 and another neighboring cartridge 120 from among the plurality of cartridges 120, between the cartridge 120 and the cover 200, between the cover 200 and the board supporter 600, or between the board supporter 600 and the cartridge 120. In order to prevent this, referring to FIG. 6, the first protrusion 122 may be formed on the cartridge 120, the second protrusion 211 may be formed on the cover 200, and the third protrusion 610 may be formed on the board supporter 600, and accordingly, the cartridge 120, the cover 200, or the board supporter 600 may be prevented from moving along the bushing member 300.

Meanwhile, a battery pack (not shown) according to an embodiment of the present disclosure may include one or more battery modules 10 according to an embodiment of the present disclosure described above. Also, the battery pack (not shown) may further include, in addition to the battery module 10, a case for accommodating the battery module 10, various devices for controlling charging and discharging of the battery module, for example, a BMS, a current sensor, and a fuse, etc.

Meanwhile, a vehicle (not shown) according to an embodiment of the present disclosure may include the battery module 10 or the battery pack (not shown) described above, and the battery pack (not shown) may include the battery module 10. Also, the battery module 10 according to an embodiment of the present disclosure may be applied to the vehicle (not shown), for example, a predetermined vehicle (not shown) prepared to use electricity, such as an electric car or a hybrid car.

While the present disclosure has been described with reference to limited embodiments and drawings, the present disclosure is not limited thereto, and various changes and modifications within the technical ideas of the present disclosure and the equivalent scope of the appended claims will become apparent to those skilled in the art from this detailed description.

INDUSTRIAL APPLICABILITY

The present disclosure relates to a battery module and a battery pack including the same, and in particular, is usable in industries related to secondary batteries.

What is claimed is:
1. A battery module comprising:
   a cartridge assembly in which a plurality of cartridges, each accommodating a battery cell, are stacked on each other in a vertical direction;
   a cover surrounding the cartridge assembly;
   a bushing member inserted through the cartridge assembly and the cover, and protruding to the outside of the cover by a pre-set interval; and
   a locking member inserted into the bushing member and locking the cover,
   wherein the cover includes a buffer member surrounding the bushing member such that the bushing member is located between the locking member and the buffer member, the locking member contacting both an upper surface of the bushing member and an upper surface of the buffer member, and
   wherein each of the plurality of cartridges comprises a first protrusion on a top surface or a bottom surface thereof, the first protrusion directly contacting a corresponding bottom surface or top surface of an adjacent cartridge such that an interval is formed between adjacent top surfaces and bottom surfaces of the cartridges within the plurality of stacked cartridges and the first protrusion does not extend into the corresponding bottom surface or top surface of the adjacent cartridge.

2. The battery module of claim 1, wherein the buffer member is combined to the cover along an outer circumference of the bushing member, and
wherein the locking member contacts the buffer member at an outer side and contacts the bushing member at an inner side.

3. The battery module of claim 1, wherein the buffer member is prepared as a rubber pad.

4. The battery module of claim 1, wherein the first protrusion is formed on the bottom surface of the cartridge.

5. The battery module of claim 4, wherein the first protrusion comprises a plurality of first protrusions formed on each of the plurality of cartridges along a circumference of the bushing member.

6. The battery module of claim 4, wherein the cover comprises a second protrusion on a bottom surface of the cover such that an interval is formed from the cartridge assembly.

7. The battery module of claim 6, further comprising a board supporter supporting a board comprising a circuit,
wherein the board supporter is disposed between the cover and the cartridge assembly, and comprises a third protrusion on a bottom surface of the board supporter such that an interval is formed from the cartridge assembly.

8. The battery module of claim 1, further comprising the buffer member in a groove in the cover, a top surface of the buffer member being above a top surface of the cover so that an outer side of a bolt head portion contacts the buffer member and an inner side of the bolt head portion contacts the bushing member.

9. The battery module of claim 1, further comprising a board supporter between the cover and an uppermost cartridge of the plurality of cartridges,
wherein the bushing and locking member extend through the board supporter.

10. The battery module of claim 9, further comprising a second protrusion on a bottom surface of the cover to form an interval between the cover and board supporter.

11. The battery module of claim 10, further comprising a third protrusion on a bottom surface board supporter to form an interval between board supporter and the cartridge assembly.

12. The battery module of claim 1, wherein the first protrusion is formed on the top surface of the cartridge.

13. The battery module of claim 1, wherein a portion of the cover extends between the buffer member and the bushing member.

14. A battery pack comprising the battery module according to claim 1.

15. A vehicle comprising the battery module according to claim 1.

* * * * *